Sept. 18, 1962 E. H. KRUSE 3,054,846
ELECTRICAL FIXTURE MOUNTING APPARATUS
Original Filed March 25, 1955 2 Sheets-Sheet 1

INVENTOR.
EUGENE H. KRUSE
BY
Lockwood, Galt, Woodard & Smith
ATTORNEYS

Sept. 18, 1962 E. H. KRUSE 3,054,846
ELECTRICAL FIXTURE MOUNTING APPARATUS
Original Filed March 25, 1955 2 Sheets-Sheet 2

INVENTOR.
EUGENE H. KRUSE
BY
Lockwood, Galt, Woodard, & Smith
ATTORNEYS

United States Patent Office 3,054,846
Patented Sept. 18, 1962

3,054,846
ELECTRICAL FIXTURE MOUNTING APPARATUS
Eugene H. Kruse, Fort Wayne, Ind., assignor to Kruse-Rieke, Auburn, Ind., a partnership
Original application Mar. 25, 1955, Ser. No. 496,739. Divided and this application Dec. 2, 1959, Ser. No. 857,245
1 Claim. (Cl. 174—63)

This is a divisional application of application Serial No. 496,739, filed March 25, 1955, now abandoned.

The present invention relates to electrical fixture mounting apparatus, and more particularly to a hanger which may be fastened to ceiling joists or sidewall studding of wood frame houses for supporting electrical fixtures or junction boxes.

It is the usual practice in mounting electrical fixtures on ceilings or sidewalls to nail telescoping hanger bars between two adjacent ceiling joists or wall studs and then fastening the electrical fixture to the bar. Since spacing between joists and studs vary, the bars are telescopically alterable in length to fit against the joists.

The present invention provides a fixture mounting apparatus which can be installed in a minimum of time and which is strong enough to support the usual household lighting fixture.

It is therefore an object of this invention to provide a hanger which can be mounted between ceiling joists or similar joists or studdings in a minimum of time.

It is another object of this invention to provide electrical fixture mounting apparatus which is so constructed that it can be installed in the proper position without the requirement of any particular measurements being made prior to installation.

It is a further object to provide a unique fastening device for securing a junction box or the like in a given position with a minimum of effort and time.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
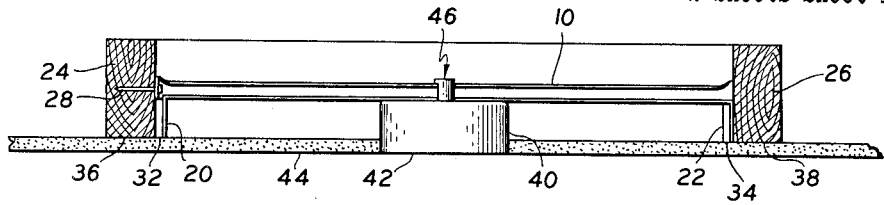
FIG. 1 is a sectional illustration of an embodiment of this invention mounted in place between two ceiling joints.

Referring to the drawings, the hanger 10 is channel-shaped in cross-section and is made of sheet metal of suitable gauge. The hanger 10 is made strong enough to support the usual household electrical fixture, whereupon a single size hanger may be a standard stock item with the electrical contractor for mounting any type of electrical fixture between studding or joists of a wood frame house.

Figure 3:
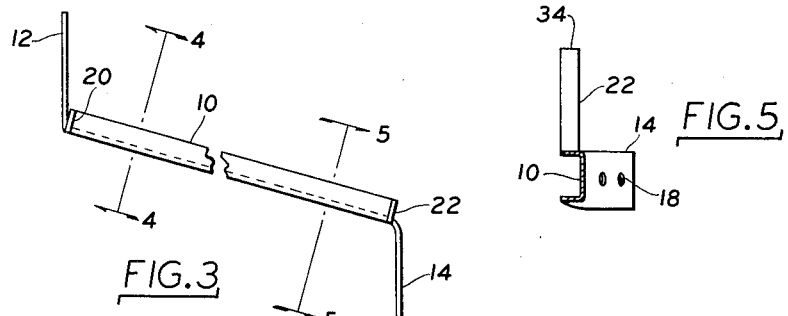
FIG. 3 is an enlarged fragmentary illustration of the hanger of the preceding figures.
Figure 5:
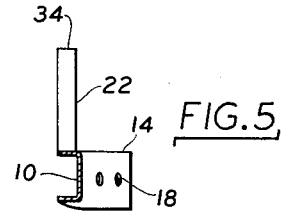
FIG. 5 is a cross-section taken substantially on section line 5—5 of FIG. 3.
Figure 4:
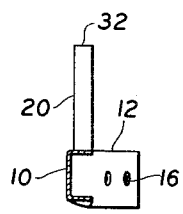
FIG. 4 is a cross-section taken substantially on section line 4—4 of FIG. 3.

On the opposite ends of the hanger 10 are two mounting flanges 12 and 14, respectively. As will be noted in FIGS. 3 and 4, these flanges extend laterally in opposite directions from the hanger 10 at obtuse angles. Each flange 12 and 14 is provided with suitable holes 16 and 18 which receive nails for fastening the hanger between two joists.

Also affixed to the opposite ends of the hanger 10 are two fingers or gauges 20 and 22 which extend from the hanger in a direction at right angles to the flanges 12 and 14, and which are of equal length.

With the hanger 10 made of sheet metal, the opposite ends thereof may be suitably lanced or cut to facilitate bending the hanger ends into the shapes of the flanges 12, 14 and fingers 20, 22.

Figure 2:
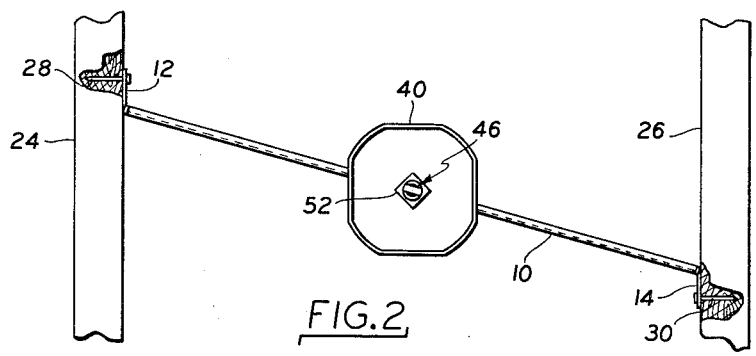
FIG. 2 is a view of the underside of the embodiment of FIG. 1.

In mounting the hanger 10 between two given ceiling joists 24 and 26, the hanger is inserted between the joists as shown in FIGS. 1 and 2 on an angle therebetween with the respective flanges 12 and 14 abutted against the joists. These flanges are then merely nailed in place by means of nails 28 and 30. However, before nailing the flanges in place, the proper location for the hanger 10 is determined by positioning the lower ends 32 and 34 of the fingers 20 and 22, respectively flush with the bottom edges 36 and 38 of the two ceiling joists. Since the fingers 20 and 22 are of equal length, the hanger 10 will be automatically positioned parallel with the under surfaces of the joists 36 and 38. The fingers 20 and 22 are formed to a particular length, such length being determined by the width dimension of the usual metallic fixture box or junction box 40, such box being adapted to receive electrical wiring connections. With the fixture box 40 mounted as shown in FIG. 1, and with the fingers 20 and 22 of proper length, the lower box edge 42 will be positioned flush with the under surface of the ceiling plaster or board 44. Thus it is seen that by properly positioning the hanger 10, the fixture box 40 is automatically positioned with respect to the exposed surface of ceiling plaster. It is obvious that this feature permits accurate installation of box 40 to be accomplished with a minimum of time and effort.

In mounting the box 40 on the hanger 10, a suitably slotted stud 46 threaded at one end 48 is slidably straddled over the hanger 10 to pass through the usual mounting opening 50 in the box 40. A simple nut 52 is received by the threaded portion 48 to secure the box 40 is position.

By means of the sliding fit of the stud 46 of the hanger 10, the box 40 may be centered exactly between the studs 24 and 26.

It will be noted that the method of mounting the hanger 10 as illustrated in FIGS. 1 and 2 permits the hanger to be mounted between joists at random spacing, closer spacing than that illustrated in FIG. 2 being accommodated by mounting the hanger 10 at a sharper angle than that illustrated. With wider spacing, the hanger 10 will be closer to right angles to the joists than that illustrated. The fact that the mounting flanges 12 and 14 extend at obtuse angles from the hanger 10 makes them readily accessible for easy nailing without the head of the hammer striking the hanger itself.

Figure 7:
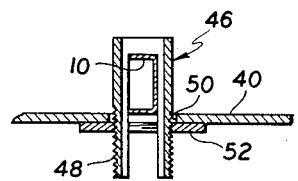
FIG. 7 is a cross-section of the hanger stud of FIG. 6 and an electrical fixture box mounted on the hanger of the preceding figures.
Figure 6:
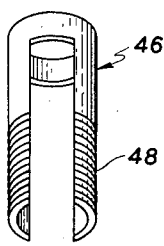
FIG. 6 is a perspective illustration of a hanger stud.
Figure 8:
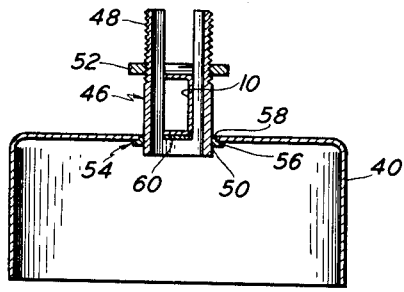
FIG. 8 is a sectional illustration of a different embodiment of this invention.
Figure 9:
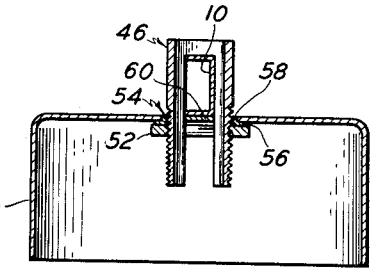
FIG. 9 is similar to FIG. 8 but with the mounting device reversed.
Figure 10:
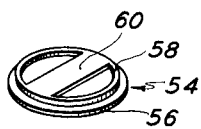
FIG. 10 is a perspective illustration of a bushing type washer used in FIGS. 8 and 9.

As seen in FIG 7 there is a slight clearance between the opening 50 and the slotted stud 46 which permits slight relative movement btween the box and the stud. By inserting the bushing of FIG. 10, indicated by the reference numeral 54 between the box opening 50 and the stud 46, a tight fit is provided. This bushing 54 is unique in construction and comprises a radial flange 56, an axial insert 58 and a diametral bar 60. By passing the stud 46 over the diametral bar as illustrated in FIG. 8, the box 40 may be mounted on the hanger 10 by placing the nut 52 on the top side of the hanger instead of the bottom side as indicated in FIG. 7. In FIG. 9, the stud 46 is reversed in position and the nut 52 is turned up tightly agains the bushing 54. Thus, the same bushing is usable for mounting the stud 46 from either side of the hanger. This flexibility in design increases the versatility of the invention.

It should be noted in FIG. 8 that more space is available inside the box 40 for wire or the like.

Figure 11:
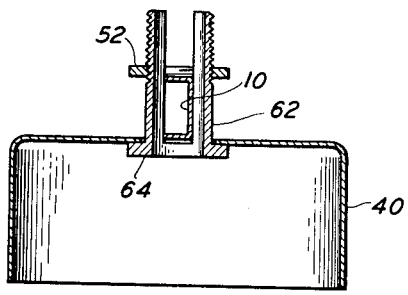
FIG. 11 is a sectional illustration of still another embodiment of this invention.

In FIG. 11 is illustrated a slightly different embodiment of the invention wherein a different type of stud 62 is provided with a flanged head 64 which engages the underside of the box 40 as shown. The stud 62 straddles the hanger 10 to receive the usual nut 52 which is turned down against the hanger. As in the case of FIG. 8 the arrangement of FIG. 11 provides more space internally of the box.

As illustrated in FIG. 11, the bushing 54 may be eliminated when the stud is provided with a head 64; only two parts, the stud 62 and the nut 52, thereby being required to secure the box 40 to the bar 10.

By reason of the longitudinal slot in the stud 62, it is possible for the nut 52 to be tightened against the bar 10 to the extent that the nut will tend to spring the stud sides inwardly toward each other thereby causing disengagement of the mating threads. However, since the slot has a sliding fit with the bar, the stud sides cannot move inwardly beyond the width of the bar which prevents the threads from stripping.

As illustrated in the drawings, the stud slot is of substantially the same width as the bar, thereby providing the sliding fit as well as preventing the stud sides from springing inwardly. Further, the mating threads act as a cam forcing the stud sides firmly against the bar sides when the nut 52 is tightened against the bar 10; this results in the stud clamping tightly onto the bar to hold the mounted fixture against movement.

What is claimed is:

An electrical fixture mounting apparatus comprising an elongated rigid bar, an electrical fixture provided with an aperture, an annular bushing having an inner axially extending portion fitting into said aperture and a radial flange engaging said fixture around said aperture, said bushing having a diametral bar thereacross which connects at its opposite ends to said inner portion, a slotted hanger stud straddling both said bars and passing through said aperture, and a retaining device on said stud clamping said bars and said fixture together.

References Cited in the file of this patent

UNITED STATES PATENTS

| | | |
|---|---|---|
| 462,752 | Weber | Nov. 10, 1891 |
| 875,872 | Walsh | Jan. 7, 1908 |
| 1,135,699 | Knauber | Apr. 13, 1915 |
| 1,311,473 | Vossler | July 29, 1919 |
| 1,709,614 | Fadell | Apr. 16, 1929 |
| 1,948,838 | Bash | Feb. 27, 1934 |
| 2,528,418 | Buckels | Oct. 31, 1950 |
| 2,550,662 | Austin | May 1, 1951 |
| 2,681,469 | Condon | June 22, 1954 |

FOREIGN PATENTS

| | | |
|---|---|---|
| 447,323 | Great Britain | May 18, 1936 |